United States Patent [19]

Reuter et al.

[11] 3,927,112

[45] Dec. 16, 1975

[54] PROCESS FOR THE PREPARATION OF BIS-HYDROXYMETHYL-METHYLPHOSPHINE

[75] Inventors: Martin Reuter, Kronberg, Taunus; Claus Beermann, Wildsachsen, Taunus, both of Germany

[73] Assignee: Hoechst Aktiengesellschaft, Frankfurt am Main, Germany

[22] Filed: Apr. 11, 1974

[21] Appl. No.: 460,151

[30] Foreign Application Priority Data

Apr. 14, 1973 Germany.............................. 2319043

[52] U.S. Cl........................................ 260/606.5 P
[51] Int. Cl.$^2$..................................... C07D 105/02
[58] Field of Search............................ 260/606.5 P

[56] References Cited

UNITED STATES PATENTS

| | | | |
|---|---|---|---|
| 3,291,840 | 12/1966 | Buckler et al................ | 260/606.5 P |
| 3,293,302 | 12/1966 | Popoff et al.................. | 260/606.5 P |
| 3,477,953 | 11/1969 | Carlson ...................... | 260/606.5 P X |
| 3,660,495 | 5/1972 | Lin .............................. | 260/606.5 P |

OTHER PUBLICATIONS

Chemical Abstracts, Vol. 70, 115227s (1969), corresponds to Kamai et al., Zh. Obshch. Zkim., Vol. 39(2), pp. 379–382, (1969).
Trippett, *J. Chem. Soc.*, p. 2813 to p. 2816 (1961).
Chemical Abstracts, Vol. 68, 39721q (1968).
Chemical Abstracts, Vol. 66, 65626r (1967).
Chemical Abstracts, Vol. 56, 1475q and 6002e (1962).
Chemical Abstracts, Vol. 70, 20112m (1969).
Chemical Abstracts, Vol. 68, 87350q (1968).

*Primary Examiner*—Helen M. S. Sneed
*Attorney, Agent, or Firm*—Curtis, Morris & Safford

[57] ABSTRACT

A process is provided for the catalytic preparation of bis-(hydroxymethyl)-methylphosphine oxide, which comprises mixing tris-(hydroxymethyl)-phosphine with at least 1 weight % of carbon tetrachloride or carbon tetrabromide at temperatures of from −10° to +120°C, and, after completed reaction, isolating the bis-(hydroxymethyl)-methylphosphine oxide so obtained by distilling off the carbon tetrahalide.

9 Claims, No Drawings

PROCESS FOR THE PREPARATION OF BIS-HYDROXYMETHYL-METHYLPHOSPHINE

The present invention relates to a process for the preparation of bis-hydroxymethyl-methylphosphine oxide.

It is known to prepare bis-hydroxymethyl-methylphosphine oxide by oxidizing bis-hydroxymethyl-methylphosphine with hydrogen peroxide to form phosphine oxide according to usual methods; the bis-hydroxymethyl-methylphosphine being prepared from tris-hydroxymethyl phosphine by addition of methyl iodide and degradation of the tris-hydroxymethyl-methylphosphonium iodide with triethylamine according to the following reaction scheme:

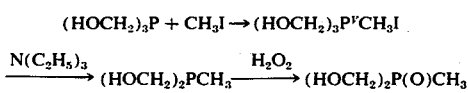

(see E. I. Grinstein, Chem. Abstracts, Vol. 56, pp. 1475 and 6002, USSR Pat. No. 138,618, furthermore R. K. Valetchinov, Chem. Abstracts, Vol. 68, p. 8428).

However, the triethylamine degradation of tris-hydroxymethyl-methylphosphonium iodide proceeds with only poor yields, and there is a great expenditure in chemicals which are lost in the end.

G. Ch. Kamaj et al. (*J. obsc. chimii*, Vol, 39 (1969), pp. 379 to 382) describe tests according to which tri-(oxymethyl)-phosphine and carbon tetrachloride do not react with each other even when they are heated to boiling temperature.

It has now been found that bis-(hydroxymethyl)-methylphosphine oxide may be prepared by mixing tris-(hydroxymethyl)-phosphine with at least 1 % by weight of carbon tetrachloride or carbon tetrabromide at a temperature of from $-10°$ to $+120°C$, and, after the reaction is complete, isolating the bis-(hydroxymethyl)-methylphosphine oxide by distilling off the carbon tetrahalide.

Preferred are temperatures of from 5° to 80°C, especially from 20° to 70°C, and the exclusion of water and alcohols. Since the reaction, which is a rearrangement of an oxygen atom from a—$CH_2OH$ group to the P-atom according to the following scheme

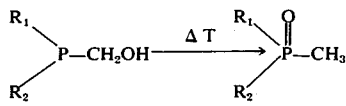

is exothermal, it is advantageous to operate with dilution in the presence of an inert organic solvent or suspension agent. Such diluents are for example benzene, octane, dimethyl formamide, benzonitrile, tetramethyl urea, methylene chloride, chloroform, chlorobenzene, ethers such as diisopropyl ether, esters such as ethyl acetate, or mixtures of these diluents. Preferably, a diluent is chosen the boiling point of which is the same as the desired reaction temperature.

Relative to the tris-(hydroxymethyl)-phosphine used, from ⅓ to 10-fold, preferably from 1 to 4-fold, weight amounts of diluent are added. When no diluent is used, temperatures of from 5° to 30°C are preferred.

The amount of carbon tetrachloride or tetrabromide catalyzing the rearrangement of the tris-(hydroxymethyl)-phosphine should be at least 1 weight %, relative to the phosphine employed. The upper limit is not critical; both catalysts themselves may also serve as diluent. Generally, from 10 to 2000 weight %, preferably from 20 to 1000 weight %, of carbon tetrachloride or tetrabromide are used, relative to the phosphine employed. When less than 100 weight % are used, the addition of one of the above diluents (from 100 to 1000 weight %) is preferred. The reaction time, depending on the reaction conditions, is from about 0.1 to 80 hours. Advantageously, the reaction is carried out with exclusion of oxygen. Generally, the catalyst amounts are smaller and the reaction times shorter the more the temperature is elevated.

Work-up is carried out in known manner after cooling of the reaction batch by distilling off the catalyst and the diluent, and, optionally, further purification of the crude product by recrystallization, for example from dimethyl formamide or ethanol.

The bis-(hydroxymethyl)-methylphosphine oxide obtained according to the present invention, just as a comparative sample prepared according to the method of E. I. Grinstein, is a colorless hygroscopic solid having a melting point of about 70°C (mixed melting point with the product according to Grinstein showing no depression) which is easily soluble in hydrophilic solvents such as lower alcohols, glycol or dimethyl formamide, but insoluble in lipophilic solvents such as chloroform, ethyl acetate or dioxan. The bis-phenyl-urethane $(C_6H_5NHCO_2CH_2)_2P(O)CH_3$ obtained by addition of 2 moles of phenyl isocyanate has a melting point of 172°C when it is recrystallized from ethanol, just as a comparative sample from the product prepared according to E. I. Grinstein; the mixed melting point does not show any depression also in this case.

The NMR spectrum in $D_2O$ shows a doublet for the methyl protones at $\delta = 1.4$ ppm and 1.7 ppm, a doublet for the methylene protones at 4.0 and 4.1 ppm, and a singlet for the OH protones at 4.7 ppm, relative to tetramethyl-silane.

The IR spectrum, as in the case of $OP(CH_2OH)_3$, shows the intense PO band at 1140 cm$^{-1}$, an intense PC band at 1100 cm$^{-1}$, an intense OH band at 3300 cm$^{-1}$, and, additionally, intense characteristic bands at 900 and 925 cm$^{-1}$.

The product so obtained may be applied in the manufacture of flameproof polyurethanes, and as intermediate product for syntheses especially of flameproofing agents.

The following examples illustrate the invention.

EXAMPLE 1

In an apparatus comprising a flask with agitator, 124 g of tris-hydroxymethylphosphine and 1000 g of carbon tetrachloride were stirred with refluxing and heated to 50°C under a nitrogen atmosphere, which caused an exothermic reaction of the emulsion formed, which reaction, despite cooling, caused the carbon tetrachloride to boil. After the reaction was complete and the agitator switched off, the emulsion separated to form a lower phase ($CCl_4$) and an oily upper phase which, after having distilled off the residual carbon tetrachloride, yielded 120 g of a crystallizing oil having a melting point of 56°C. After a double recrystallization from dimethyl formamide and ethanol, the melting point was 69°C. The IR and NMR spectra were identical to the $(HOCH_2)_2P(O)CH_3$ prepared according to Grinstein, and also the gas chromatogram, after silylation using N,O-bis-trimethylsilyl-acetamide; that is, it showed 97% of bis-(trimethylsilyl-oxymethyl)-methylphosphine oxide, elution temperature 204°C, and 2% of tris-(trimethylsilyloxymethyl)-phosphine oxide, elution temperature 216°C.

Analysis: $C_3H_9O_3P$. Calculated: C 29.0%; H 7.3%; P 25.0%; Found: C 28.5%; H 7.2%; P 24.5%.

EXAMPLE 2

In an apparatus comprising a flask with agitator, 0.15 mol = 19 g of tris-hydroxymethylphosphine were dissolved at room temperature under a nitrogen atmosphere in 19 g of dimethyl formamide, and 5.5 g = 0.037 mol of carbon tetrachloride were added. The clear solution immediately reached a temperature of 80°C and was maintained at this temperature for a further 8 hours. After having distilled off the catalyst and the diluent under highly reduced pressure up to a sump temperature of 80°C, 18 g of residue were obtained, a product identical to the bis-(hydroxymethyl)-methylphosphine oxide obtained according to Example 1. 1.2 g (0.01 mol) of this product were reacted with 2.5 g (0.021 mol) of phenyl-isocyanate in 5 g of dimethyl formamide with addition of 0.3 g of pyridine. The reaction proceeded with self-heating to 50°C. After the reaction solution was abandoned for 2 hours at 50°C, it was stirred into 100 parts of water having a temperature of 20°C, which caused the bis-phenyl-urethane to precipitate in a wax-like form and to solidify overnight; melting point 165°C. After recrystallization of the crude urethane from 2 parts of ethanol, the melting point of the derivative obtained with a good yield was 172°C, and it did not increase any more after a further recrystallization.

Analysis: $C_{17}H_{19}N_2O_5P$. Calculated: C 56.4%; H 5.2%; N 7.7%; P 8.5%. Found: C 57.0%; H 5.3%; N 8.1%; P 8.2%.

The comparative product according to E. I. Grinstein, reacted in the same manner with phenyl-isocyanate, yielded the same bis-phenyl-urethane; the mixed melting point of both urethanes showed no depression.

EXAMPLE 3

In an apparatus comprising a flask with agitator, 19 g of tris-hydroxymethylphosphine and 70 g of chloroform, to which 5 g of carbon tetrachloride were added, were stirred under a nitrogen atmosphere with refluxing for 12 hours at 61°C. The conversion to bis-(hydroxymethyl)-methylphosphine oxide occurred slowly in the emulsion-like mixture as was proved by samples taken from the batch and examined by IR spectroscopy and iodometry. After the reaction was complete, the chloroform and the catalyst were distilled off at 70°C under reduced pressure. As residue, 18 g of an oil crystallizing on cooling was obtained, which was identical to the bis-(hydroxymethyl)-methylphosphine oxide obtained according to Example 1. When the test was repeated without adding carbon tetrachloride, the tris-hydroxymethylphosphine was converted only after 50 hours, but for about a half to by-products of another kind.

EXAMPLE 4

In an apparatus comprising a flask with agitator, 31 g of tris-hydroxymethylphosphine and 45 g of benzene were stirred under a nitrogen atmosphere at 65°C. Within 15 minutes, 8 g of carbon tetrachloride were added dropwise to the emulsion-like mixture obtained. Subsequently, the batch was stirred wtih refluxing for another 6 hours at 70°C., and then the diluent and catalyst were completely distilled off at 80°C under reduced pressure. As residue, 30 g of a colorless oil crystallizing on cooling and having a melting point of 48°C were obtained, which oil, after recrystallization from ethanol, was identified as being bis-(hydroxymethyl)-methylphosphine oxide as indicated in Example 1 (melting point 69°C).

EXAMPLE 5

In an apparatus comprising a flask with agitator, 62 g of tris-hydroxymethylphosphine were added dropwise within one hour, with vigorous agitation and refluxing, at a temperature of 80°C under a nitrogen atmosphere, to a mixture of 90 g of benzene and 16 g of carbon tetrachloride. The rearrangement reaction proceeded with heat generation. The resulting emulsionlike reaction mixture was stirred with refluxing for a further ½ hour and then abandoned, which caused the separation of phases. After removal of residues of the catalyst and diluent at 70°C under reduced pressure, 60 g of an oil were obtained from the lower phase, which oil, on cooling, formed a crystallized mass having a melting point of 48°C. This mass, after recrystallization from ethanol, was identified as being bis-(hydroxymethyl)-methylphosphine oxide by IR spectroscopy and gas chromatography (melting point 69°C).

EXAMPLE 6

In an apparatus comprising a flask with agitator, 62 g of pulverulent tris-hydroxymethylphosphine were added, under a nitrogen atmosphere, to 320 g of carbon tetrachloride having a temperature of 3°C. After stirring for about 24 hours at 5°C, an emulsion had formed which was stirred for another 2 hours at 25°C. After the agitator was switched off, an oily upper phase separated which was taken off, and from which residues of carbon tetrachloride were removed at 60°C under reduced pressure. 61 g of an oily residue remained, which solidified on cooling to form a crystallized mass (melting point 49°C), and was identified as being bis-(hydroxymethyl)-methylphosphine oxide (melting point 69°C).

We claim:

1. A process for the preparation of bis-(hydroxymethyl)-methyl phosphine oxide which comprises contacting tris-(hydroxymethyl)-phosphine with at least about 1% by weight of carbon tetrachloride or carbon tetrabromide at a temperature between about −10° and about 120°C. substantially in the absence of oxygen, water and alcohol, and after reaction distilling off the carbon tetrahalide to isolate said bis-(hydroxymethyl)-methyl phosphine oxide, the percent being based on the weight of said tris-(hydroxymethyl)-phosphine.

2. A process according to claim 1 wherein the reaction is conducted under an atmosphere of nitrogen and in an anhydrous and non-alcoholic medium.

3. A process according to claim 1 wherein from about 10% to about 2000% of said carbon tetrahalide is used.

4. A process according to claim 1 wherein from about 20% to about 1000% of said carbon tetrahalide is used.

5. A process according to claim 1 wherein the reactants are in an inert solvent, and said inert solvent is distilled off with said carbon tetrahalide.

6. A process according to claim 5 wherein said inert solvent is used in an amount of from about ⅓ to about 10 times the amount of said tris-phosphine.

7. A process according to claim 1 wherein said temperature is between about 5° and about 80°C.

8. A process according to claim 1 wherein said temperature is between about 20° and about 70°.

9. A process according to claim 1 wherein from about 100% to about 1000% of said carbon tetrahalide is used and said temperature is between about 5° and about 30°C.

* * * * *